United States Patent
Bhattacharya

(10) Patent No.: US 7,205,353 B2
(45) Date of Patent: *Apr. 17, 2007

(54) SELF-PRIMING COIL COATING COMPOSITION AND METHOD

(75) Inventor: Dhrubo Bhattacharya, New Delhi (IN)

(73) Assignee: Rotomac Electricals Pvt. Ltd., Calcutta (IN)

( * ) Notice: Subject to any disclaimer, the term of this patent is extended or adjusted under 35 U.S.C. 154(b) by 366 days.

This patent is subject to a terminal disclaimer.

(21) Appl. No.: 10/834,127

(22) Filed: Apr. 29, 2004

(65) Prior Publication Data

US 2004/0204538 A1    Oct. 14, 2004

Related U.S. Application Data

(63) Continuation-in-part of application No. PCT/IB02/05768, filed on Dec. 27, 2002.

(51) Int. Cl.
*C04B 24/22* (2006.01)
(52) U.S. Cl. .................. 524/356; 524/247; 524/557
(58) Field of Classification Search ............ 524/356, 524/557, 247
See application file for complete search history.

(56) References Cited

U.S. PATENT DOCUMENTS

| | | | |
|---|---|---|---|
| 3,104,236 A | 9/1963 | Lavin et al. | 260/45 |
| 3,105,775 A | 10/1963 | Lavin et al. | 117/232 |
| 3,207,626 A | 9/1965 | Lavin et al. | 117/218 |
| 3,526,678 A | 9/1970 | Dahms et al. | 260/844 |
| 3,639,330 A | 2/1972 | Fitzhugh et al. | 260/31 |
| 4,071,578 A | 1/1978 | Lasher | 260/850 |
| 4,098,749 A | 7/1978 | Hoshino et al. | 260/30 |
| 4,140,729 A | 2/1979 | Tobias et al. | 524/539 |
| 4,734,467 A | 3/1988 | Yamada et al. | 525/440 |
| 4,994,517 A | 2/1991 | Vohrer | 524/357 |
| 5,077,332 A | 12/1991 | Blattler et al. | 524/389 |
| 5,322,884 A | 6/1994 | Wellman et al. | 524/601 |

FOREIGN PATENT DOCUMENTS

GB    1221312    2/1971

OTHER PUBLICATIONS

DATABASE WPI, Derwent Publications, Ltd., XP002242188 and JP 48 011566 B (Tamura Kaken Co LTD).
DATABASE WPI, Derwent Publications, Ltd., XP002225938 and JP 49 041627 B (Tokyo Shibaura Electric Co) , Nov. 9, 1974.
Database CA Online, Nikolaev et al, Curing process of film-forming magnetic suspensions, XP002253624, 1989.

*Primary Examiner*—Peter D. Mulcahy
(74) *Attorney, Agent, or Firm*—Jacobson Homan PLLC

(57) ABSTRACT

The invention discloses self-priming coating composition based on a vinyl terpolymer, a monomeric or oligomeric alkoxy amino resin cross linker and a multi component combination of two or more resins selected from (a) oligomeric saturated polyester resin, (b) oligomeric unsaturated polyester resin dissolved in an unsaturated monomer with a free radical initiator (c) oligomeric bifunctional phenolic resole resin and (d) oligomeric epoxy resin (e) low molecular weight polyurethane resin and (f) short to medium oil alkyd resin, wherein said vinyl terpolymer is predominantly polyvinyl formal with polyvinyl alcohol and polyvinyl acetate as two other co-polymers. The composition can be applied as a clear coat or as a pigmented composition with addition of pigment on ferrous and non-ferrous metallic substrate and is particularly suitable for continuous coil coating lines for both dark and light colour metal coatings. The invention also concerns method of coating ferrous and non-ferrous metallic substrate by applying the said coating composition on a degreased but untreated surface and coated articles so produced.

49 Claims, No Drawings

SELF-PRIMING COIL COATING COMPOSITION AND METHOD

This is a continuation-in-part of PCT/IB02/05768 filed filed Dec. 27, 2002 and published in English.

FIELD OF THE INVENTION

This invention relates to a chromate free self-priming heat curable coating composition based on a polymeric material, particularly a vinyl terpolymer of polyvinyl formal, polyvinyl alcohol and polyvinyl acetate and an alkoxy amino resin used in combination with two or more of resins selected from saturated polyester, unsaturated polyester with an unsaturated monomer, epoxy, phenolic, urethane and alkyd resins. The coating compositions can be applied on ferrous or non-ferrous metallic substrates. The rapid curing nature coupled with high flexibility and scratch hardness, and resistance against chemicals, staining, corrosion and dry heat makes these compositions ideal for continuous metal coil coating lines. The coatings can be formulated both as a clear coating as well as a pigmented coating in a range of colors in a blend of volatile organic solvents. The coatings are self-priming in nature and can be applied as a topcoat directly on the metal surface without chromate pre-treatment or any primer thereby making the coating method most cost effective. The elimination of toxic chromates also makes the coating environment friendly.

BACKGROUND OF THE INVENTION

Pre-coating of metals in continuous coil coating lines, processing rolled stock such as cold rolled steel (CRS), galvanized steel, galvalume and aluminum etc., constitutes a major industrial activity today. The organic products normally employed for this purpose are based on silicones, polyesters, epoxies, urethanes, acrylics and combinations thereof, PVC plastisols and fluorocarbons. Most of these products are solvent based i.e. contain a volatile organic solvent, though some are also available as powdered resin to be applied as powder coatings. Generally these products require specific primers as they lack the ability to adhere directly to different substrates in the short oven dwell times of continuous coil coating lines.

The products used for metal pre-coating in continuous coil coating lines, enumerated earlier, have a limitation in that these do not generally offer a combination of high scratch hardness with good flexibility. This combination is most desirable since the pre-coated metal sheets have to undergo fabrication involving rigorous forming and flexing operations in engineering, appliance and construction industries. Hardness of thermosetting coatings depends on the density of cross-links achieved during cure. As this density increases, the material hardens but begins to lose its flexibility. Contrarily, a coating that is inherently flexible being largely thermoplastic, has poor thermal resistance and hardness. Polyesters have been extensively studied in this regard to obtain the desired combination of hardness and flexibility. A survey of such compositions (U.S. Pat. Nos. 4,140,729, 4,734,467, 5,322,884) reveals that it is very difficult to resolve these conflicting demands in coatings on hard metallic substrates. Increasing the aromatic content and/or inorganic pigment level increases the hardness but lowers the flexibility. Increasing the molecular weight of linear aliphatic chains has the opposite effect on cured resin properties though this is restricted by requirement of resin compatibility with the amino resin cross-linkers. A combination of these approaches has been generally employed in polyester resin compositions. The primers normally used for these products contain large amounts of organic and inorganic corrosion inhibiting compounds. Such additives in some cases include chromium compounds, which are considered to be toxic and harmful. Primer is normally applied after a chromate pre-treatment, which too is toxic. Additionally priming of metal substrate is expensive and time consuming, as this adds another operation to the coating scheme besides increasing the cost of removal of the paint during stripping operation. It also adds to the overall thickness of the coating, which may be undesirable in certain applications. Self-priming coatings with good barrier and dielectric characteristics offer excellent corrosion protection. A quick curing, self-priming polyester has been proposed for coil coating (U.S. Pat. No. 4,071,578) that is quite flexible, passing a 1T bend test, but is low in hardness offering a maximum pencil hardness of only H—.

Polyvinyl acetals have been used in metal coating applications principally in wire enamels for several decades and provide excellent insulating properties, chemical resistance and flexibility to the cured coatings. These heat reactive formulations use polyvinyl formal (PVF), in large proportion as the major constituent, with small proportions of phenolic resins with or without melamine and isocyanate resins etc. dissolved in cresol. Consequently the solids in such formulations are generally below 25% by weight due to the drastic viscosity rise caused by the PVF. Such formulations have been used to coat magnet wire, generally for low temperature application, as the PVF largely retains its thermo plasticity and greatly enhances the flexibility and extensibility of the coated substrate. PVF has also been suggested for use as a binder in other insulating applications (JP-48011566B, JP-49041627B) and polyvinyl acetals have been used in thin film lacquer compositions to be applied by ink-jet process (U.S. Pat. No. 4,994,517). Polyvinyl butyral has long been used as the principal constituent of wash/shop primers on metal substrates (U.S. Pat. Nos. 5,077,332, 4,098,749). Such products provide good corrosion resistance due to the chromate or borate ions complexed with the butyral film obtained on air drying these at room temperature and serve as tie-coat for the topcoat paint applied subsequently.

The co-pending PCT application PCT/IB02/01509 by the same applicant describes a self-priming coil coating formulation based on a linear vinyl terpolymer containing acetyl, hydroxyl and formal pendant groups on the vinyl backbone and an oil based alkyd co-resin. Another co-pending PCT application No. PCT/IBO2/03749 by the same applicant describes a self-priming coil coating composition incorporating this vinyl terpolymer with a saturated oligomeric polyester co-resin and an alkoxy amino resin cross linker. The former composition is highly scratch and abrasion resistant with pencil hardness of at least 6H and extremely flexible (passes 0T bend test). The latter composition cures at a PMT of 230° C. to provide a flexible (OT) and hard coating with a scratch hardness of at least 6H. However, both these compositions have a limitation in that the solid content of solvent bearing pigmented compositions, with viscosities amenable to coil coating, a re in the range of 30–40% by weight.

The coating composition with higher solid content has twin advantages. Firstly, compositions with higher solids adds to the through put by increasing the DFT of coated substrates per unit of run time. Secondly, an increase in the non-volatile solid contents ultimately helps to reduce proportion of volatile components mainly the solvents that cause environmental hazards during the curing process.

The inventor of the instant invention has found that when the linear vinyl terpolymer containing hydroxyl, acetyl and formal groups, along with an alkoxy amino resin, is used in combination with two or more of resins of low molecular weight, selected from the group consisting of saturated polyester, unsaturated polyester with an unsaturated monomer, bifunctional phenolic resole, epoxy, urethane and short to medium oil alkyd resins, more solids can be incorporated. These compositions also permit higher pigment loading than achieved in the earlier pending applications cited. The vinyl macromolecule offers limited sites for cross-linking through its reactive pendant hydroxyl groups and thereby a lightly cross-linked matrix where a long linear polymer is interlinked with short chains of the resins is obtained which is tough as well as hard and possesses outstanding thermal, chemical and corrosion resistance even without the inclusion of any corrosion inhibiting pigment. The alkyd resin enhances gloss and thermal resistance, while saturated polyester permits better color retention. Unsaturated polyester on cure increases the hardness and epoxy, phenolic and urethane resins increase the chemical resistance of cured coatings. However urethane resins lower hardness of the multi-component coatings. All the compositions exhibit excellent flow and adhesion on a variety of ferrous and non-ferrous substrates even without pre-treatment. It is therefore possible to eliminate the use of chromates totally from coil coating practice. It will be obvious to someone skilled in the art that such properties offer important advantages in a variety of coil coating applications.

OBJECTS OF THE INVENTION

The first object of the invention is to provide quick curing polymeric coating compositions that are suitable for continuous coil coating lines.

The second object of the invention is to provide polymer coatings, which have high degree of flexibility and surface hardness at the same time.

The third object of the invention is to provide environment friendly chromate free self-priming corrosion resistant colored coating compositions containing minimum 40% solids including the binder and pigments.

Another object of the invention is to provide a coating method for coating a degreased ferrous or non-ferrous metallic substrate that need not be pre-treated, using primer free corrosion resistant coatings.

Yet another object of the invention is to apply the coating composition of the invention as an under coat followed by one or more top coat(s) of the same coating or any polyester, epoxy, alkyd and urethane coatings.

Yet another object of the invention is to provide coated articles at least one surface of which is coated with the coating composition according to the invention.

SUMMARY OF THE INVENTION

The present invention provides a self-priming, rapid curing, chromate free, corrosion resistant coating composition comprising:
a) a linear vinyl terpolymer having three randomly distributed functional groups comprising acetyl, formal and hydroxyl groups along the vinyl backbone, offering cross-linking sites through the hydroxyl groups during cure;
b) an oligomeric alkoxy amino resin and;
c) a combination of two or more of the resins selected from the group consisting of:
   i) oligomeric saturated polyester resin
   ii) oligomeric bi-functional phenolic resole resin
   iii) low molecular weight epoxy resin
   iv) oligomeric unsaturated polyester with an unsaturated monomer and a free radical initiator
   v) low molecular weight polyurethane resin
   vi) short to medium oil alkyd resin;
d) ortho-phosphoric acid catalyst;
e) a blend of organic solvents and optionally;
f) one or more chromate free inorganic pigment and/or organic dyes, drier(s), UV stabilizers and/or absorbers, wetting agent, and flow control agent;

The said alkoxy amino resin in oligomeric form has an average degree of polymerization of no more than three.

The unsaturated monomer is preferably diallyl phthalate (DAP) or diallyl isophthalate (DAIP) and the free radical initiator is preferably dicumyl peroxide (DCPO).

The said coating compositions may be suitably pigmented with inorganic pigments and/or organic dyes to obtain pigmented coatings in a choice of attractive colors with low to medium gloss.

The invention also provides a method of coating ferrous or non-ferrous metal substrates without chemical pre-treatment, by applying the composition according to invention on the surface of the said substrate in desired thickness and curing the same.

The invention further provides a coated article comprising a ferrous or a non-ferrous metallic substrate of which at least one surface is coated with the coating compositions according to the invention.

DETAILED DESCRIPTION OF THE INVENTION

A linear vinyl terpolymer, namely polyvinyl formal, polyvinyl alcohol and polyvinyl acetate with three functional groups randomly distributed along the vinyl backbone offers cross-linking sites through the hydroxyl groups. The density of cross-links may be controlled by the number of hydroxyl groups on the vinyl backbone of polymer. This polymer possesses a rare combination of mechanical, thermal, chemical and dielectric properties. The functional groups along with its vinyl backbone confer to this polymer the properties of adhesion, toughness, chemical inertness and heat stability while the long linear chains contribute to the outstanding flexibility. The spatial structure of this thermoplastic material helps to form a closely packed molecular structure, which in turn provides excellent barrier characteristics when coated on a wide array of substrates. The hydroxyl groups are fully accessible to cross-linking with reactive functional groups of resins and this makes the thermoplastic polymer heat curable in the presence of a mineral acid. The chain length distribution of a poly disperse polymer is made such as to permit film formation, migration by diffusion to the substrate and development of the required cohesive strength in the coating. Specifically, the terpolymer used in the invention has weight average molecular weight ranging between 15,000 and 80,000 daltons preferably between 20,000 and 50,000 daltons. The content of polyvinyl alcohol, polyvinyl acetate and polyvinyl formal of the vinyl terpolymer used for the invention is 6–15%, 9–15% and 70–84% respectively, more preferably 6.0–10%, 9–15% and 78–84% respectively, and most preferably 6–7.5%, 10–13% and 80–83% respectively by weight.

The said terpolymer useable in the composition may be produced by simultaneous hydrolysis and formalization of polyvinyl acetate in acetic acid media. For this purpose polyvinyl acetate of the required molecular weight (28,000–140,000 daltons) and of low to very low branching frequency is dissolved in acetic acid and formalin (37% formaldehyde aqueous solution) at room temperature. Dilute sulfuric acid (N/10 normality) is added to this solution with agitation. The contents are well stirred, heated to 75° C. and maintained at this condition for 20–24 hours. The whole process is conducted in a homogenous solution state. By regulating quantities of acetic acid, water and formaldehyde, the required composition of the functional groups of the vinyl backbone viz. acetyl, hydroxyl and formal may be obtained. Typically for one part of polyvinyl acetate, 1.65 parts of acetic acid, 0.55 part of water and 0.45 part of formalin (37% formaldehyde solution in water) is used to obtain a composition comprising 6.0–7.5% polyvinyl alcohol, 10.0–13.0% polyvinyl acetate and 80–83.0% polyvinyl formal. The extent of reaction is determined by the percentage of hydroxyl and acetyl groups in the extracted polymer and the reaction is terminated at the desired point by neutralizing the acid catalyst with a dilute alkali. The polymer is next precipitated from solution by adding water as non-solvent, washed and dried. The simultaneous hydrolysis and formalization reactions in a homogenous media prevent the development of blocky sequences on vinyl chain and thus helps to get a random terpolymer. The Tg of the terpolymer so produced ranges from 100–115° C.

The vinyl terpolymer used in the examples cited, is prepared by the process described, with the weight content of polyvinyl alcohol, polyvinyl acetate and polyvinyl formal at 6–7.5%, 10–13% and 80–83% respectively, and a weight average molecular weight between 25,000 and 30,000 daltons. It should be noted that a further increase of 5–7% in total solids may be possible in all the listed examples by choosing the weight average molecular weight of the vinyl polymer to be around 20,000 daltons.

To obtain the alkoxy amino resin, amino formaldehyde resin is first made by the condensation reaction of formaldehyde and a poly functional amine with the former used in excess in the presence of an alkali catalyst and the product is alkylated (butylated or methylated) after condensation with the corresponding alcohol. The alkoxy amino resin used in the present invention is a low molecular weight melamine formaldehyde resin that is methylated by etherifying its methylol groups with methanol to increase its stability and solvency in organic media. It contains heat reactive methoxy—methyl and methylol groups and approximately 96% solids.

Saturated polyester resin used in some of the compositions described later may be made from saturated carboxylic acids and anhydrides such as adipic, succinic, sebacic, phthalic, isophthalic or terephthalic and alcohols such as ethylene glycol, diethylene glycol, triethylene glycol, neopentyl glycol, propylene glycol and cyclohexane dimethanol or a combination thereof. The preferred chain length of the oligomeric resin lies between 2 and 5. The resin is produced by esterification to high conversion, a mix of a molar excess of alcohols over acids/anhydrides using a catalyst such as triphenyl phosphite and removing the water of condensation through an azeotropic solvent such as toluene. The polyester solids are obtained in solution in the azeotropic solvent. The polyester resin chosen in this invention was made from adipic and isophthalic acids, neopentyl glycol and cyclohexane dimethanol, and triphenyl phosphite catalyst in toluene solvent and contains 82% solids. The unsaturated polyester resin is produced by replacing partly or wholly, saturated acids/anhydrides by unsaturated diacids/anhydrides such as maleic or fumaric, and esterifying these with the alcohols listed earlier. Control of unsaturation in polyester is important as incomplete free radical cure lowers hardness, chemical, thermal and UV resistance of the coating. As both saturated and unsaturated polyesters cure by condensation through reactive terminal functional groups, these can be mixed to control unsaturation in the composition. Often a Diels Alder adduct made from cyclopentadiene and the unsaturated acid/anhydride is used to regulate unsaturation and to improve thermal resistance of the coating. A polyester made from maleic anhydride, dicyclopentadiene and ethylene glycol was used in the illustrative examples. The batch was processed to high conversion (acid value of 6 to 9) and the semi-solid mass was dissolved in DAP or DAIP. These monomers are low in odor, toxicity and volatility. A free radical initiator with high activation energy such as DCPO was used. The preferred molecular weight of the polyesters is below 4000 daltons.

The alkyd resin may be derived from polybasic carboxylic acids such as aliphatic saturated dibasic acids like adipic, succinic, sebacic and anhydrides thereof; aliphatic unsaturated dibasic acids such as maleic, fumaric and anhydrides thereof; and aromatic polybasic acids such as phthalic, isophthalic, terephthalic and anhydrides thereof. These acids may be used singly or in combination. The polyhydric alcohol may be selected from the group comprising of ethylene glycol, diethylene glycol, triethylene glycol, propylene glycol, neopentyl glycol, cyclohexane dimethanol, glycerol, and pentaerythritol. These alcohols may be used alone or in combination. Modified fatty acids derived from drying to non drying oils such as linseed oil, dehydrated castor oil, tung oil, soya oil and coconut oil may be used alone or in combination. Short to medium oil alkyds are selected to ensure solubility in the solvent blend chosen in the final coating compositions. Xylene is normally used as the azeotropic solvent for water removal during processing and also to solubilize the alkyd solids. Driers such as zinc octoate and/or manganese nuxtra may be added in very small proportions to accelerate cure. The alkyd resin used in this invention was produced from linseed oil, glycerin, and isophthalic acid in xylene solvent with lithium carbonate used as catalyst. The solids percentage ranged from 80–85% and its hydroxyl number ranged from 120–140.

The bi-functional phenolic resole may be made from p-substituted phenols such as p-cresol, p-tertiary amyl phenol, p-tertiary butyl phenol, or bis-phenol A, used singly or in combination and formaldehyde. The formaldehyde is used in molar excess and the condensation proceeds in the presence of an alkaline catalyst with an azeotropic solvent such as xylene, used to remove the water of condensation and the water contained in formalin, and to solubilize the solids. Care should be taken to remove water to improve storage stability of resole based formulations in the organic solvent blend. The maximum chain length preferred for this invention is 4. P-tertiary amyl phenol and bis-phenol A were used in the present invention with formalin in a molar ratio of 1:1.95 with sodium hydroxide catalyst and the solids content ranged from 65–70% by weight. The resole contains methylol terminal groups that condense with hydroxyls on the vinyl polymer and other.

Low molecular weight liquid epoxy resins made from bisphenol A and epichlorohydrin with epoxide equivalent ranging from 150–300 are preferred as these may be added in larger proportions within reasonable levels of viscosity. The epoxy resin used in the examples was Epon 830 of Shell. The epoxy resin has reactive epoxide and hydroxyl groups. Curing was effected by condensation of the hydroxyls with those of the vinyl polymer and other co-resins. No hardeners that activate cure through the epoxide were employed since these affected the storage stability of the coating composition. This epoxy has an epoxide equivalent weight of 190–210 and was used in combination with alkyd, polyester, phenolic and amino resins together with the vinyl polymer, to yield compositions with excellent adhesion, flexibility, hardness and chemical resistance.

Thermoplastic polyurethane resin should be used in moderation as it lowers the hardness of coatings. It contains heat reactive terminal hydroxyl and isocyanate groups that condense with with hydroxyls of the resins and the vinyl polymer. Estane 5715 of Noveon, a polyester based polyurethane with a solution viscosity of 40–70 cps in MEK (20% solids) containing largely terminal hydroxyls, was used in the examples.

The resin/polymer combinations were cured in the presence of ortho-phosphoric acid (88–93%). This particular catalyst provided maximum storage stability to the composition and also ensured adhesion to all substrates without any pre-treatment except degreasing. The heat curable clear coats may be formulated by dissolving the polymer first in a portion of the solvent blend and then the resins dissolved in the balance solvents together with the phosphoric acid catalyst are added to this solution. Polyurethane resins were first melted and then blended with other resins and then dissolved in the balance solvents. The basic attributes of the cured coating remains unaffected by increasing the proportion of the vinyl polymer vis-a-vis the resins, but due to the high molecular weight of the polymer, viscosity of the compositions increases dramatically. This reduces the solids content of the liquid compositions. The same effect is observed on increasing the molecular weight of the vinyl polymer. The proportion of the vinyl polymer is therefore minimized to the extent possible and its weight average molecular weight range is chosen between 20,000 and 50,000 daltons to obtain the best balance of properties. Increasing the melamine resin content decreases the curing time of the composition and also increases the hardness of the cured coating but adversely affects the flexibility. The most preferred level of melamine cross-linker is found to be 5–30% of the total weight of the resins excluding the vinyl polymer. Components of the solvent blend may be selected from aliphatic alcohols such as methanol, ethanol, isopropanol, n-butanol, iso-butanol and aromatics such as toluene, xylene. Other solvents such as glycol derivatives, methyl ethyl ketone, acetone, methyl isobutyl ketone, and solvent naphtha may also be used as co-solvents/diluents in small proportions. Many other combinations using these resins are possible in conjunction with the vinyl polymer. The heat curable clear coat systems may be pigmented to impart color in low to medium gloss to coated substrates. Titanium dioxide may be added for opacity and colored inorganic pigments and/or organic dyes may be used for color. The pigment binding power of the polymer-resin system is quite high, however, a maximum of 50% of the polymer and resin content, of pigments, is suggested for optimum flexibility and corrosion resistance. Blister resistance is obtained even with a low porosity of the film due to the passivation achieved on the metal interface. A range of corrosion inhibiting pigments may be selected comprising of inorganic and organic pigments which offer passive inhibition, for example, zinc molybdate and other molybdates, zinc phosphate, mica, tolyltriazole, complex organotitanate and other organic inhibitors which operate by passive inhibition. The incorporation of corrosion inhibiting pigments improves further the corrosion resistance of the coating. The pigments can be incorporated in the coating by first forming a mill base by conventional sand grinding or ball milling techniques, a concentrated solution of the polymer and resins of concentration 30–45% in the organic solvent blend, together with the pigments, and then blending with the remaining portion of solvents by high speed stirring to obtain a final solids content of 40–60%. Other additives such as heat and light stabilizers may be added in small proportions. For example, as UV stabilizers and/or absorbers TINUVIN, UVA series of compounds marketed by Ciba Geigy Corporation may be used.

The examples of wetting agents that can be used for the composition are amino acid and oleyl-amino-oleate. Silicon additives can be used as a flow control agent.

The coating, with or without pigments, dries by solvent evaporation on substrates such as cold rolled steel, galvanized steel, stainless steel, galvalume, tin plated steel, aluminum when sprayed or flow coated on these surfaces. The rate of evaporation of the solvents especially at the cure temperatures used in metal pre-coat lines with peak metal temperatures ranging from 200–280° C. may be adjusted by the choice of the solvents from the ones enumerated earlier. Specifically, a binary blend of xylene and butanol in a 60:40 weight ratio was found most suitable and was used for all compositions. The small quantities of solvents contained in the resins have been accounted for in all the formulations, or, the amount of solvent blend used in these includes the amount of solvents in these resins so that a 100% solids basis has been chosen for the resins. Cure time in the heated oven varied from 30 to 90 seconds and the PMT ranged from 199° C. to 260° C.

The coating composition of the instant invention may be applied to ferrous and non-ferrous substrate including CRS, galvanized steel, stainless steel, tin plated steel, galvalume, aluminum and other non-ferrous substrates using wire wound draw down bars in films of dry film thickness (DFT) ranging from 5–30 micrometers preferably 5–15 micrometers. The self-priming compositions are particularly suited to metal pre-coating process in coil coating lines because of their quick curing nature. These can be formulated as free flowing one pack liquid that can be stored below 20° C. for 6 (six) months.

Many combinations of resins may be employed with the vinyl terpolymer to obtain pigmented compositions with minimum of 40% solids by weight. The following examples of compositions are illustrative of the invention and are not intended to limit the scope of the invention as defined by the appended claims.

EXAMPLE 1

A clear coat composition may be made from the following ingredients in the assigned range of parts by weight:

| INGREDIENTS | RANGE OF PARTS BY WEIGHT |
| --- | --- |
| Vinyl terpolymer | 1.0 |
| Melamine Resin (100% solids basis) | 0.4–0.5 |
| Polyurethane Resin | 0.8–0.88 |
| Sat'd Polyester (100% solids basis) | 1.3–1.87 |
| Butanol | 2.4–2.7 |
| Xylene | 3.6–4.0 |
| Phosphoric Acid | 0.1–0.15 |

EXAMPLE 2

A clear coat composition may be made from the following ingredients in the assigned range of parts by weight:

| INGREDIENTS | RANGE OF PARTS BY WEIGHT |
| --- | --- |
| Vinyl terpolymer | 1.0 |
| Melamine Resin (100% solids basis) | 0.2–0.3 |

-continued

| INGREDIENTS | RANGE OF PARTS BY WEIGHT |
|---|---|
| Phenolic Resin (100% solids basis) | 0.9–1.0 |
| Sat'd Polyester (100% solids basis) | 0.9–1.0 |
| Butanol | 2.3–2.5 |
| Xylene | 3.4–3.7 |
| Phosphoric Acid | 0.1–0.15 |

EXAMPLE 3

A clear coat composition may be made from the following ingredients in the assigned range of parts by weight:

| INGREDIENTS | RANGE OF PARTS BY WEIGHT |
|---|---|
| Vinyl terpolymer | 1.0 |
| Melamine Resin (100% solids basis) | 0.25–0.3 |
| Phenolic Resin (100% solids basis) | 0.8–1.0 |
| Epoxy Resin (100% solids basis) | 1.0–1.1 |
| Butanol | 2.3–2.7 |
| Xylene | 3.5–4.0 |
| Phosphoric Acid | 0.1–0.15 |

EXAMPLE 4

A specific white pigmented composition was made from the following ingredients in the assigned percentage by weight:

| INGREDIENTS | PERCENTAGE BY WEIGHT |
|---|---|
| Vinyl terpolymer | 10.1 |
| Melamine Resin (100% solids basis) | 3.4 |
| Sat'd Polyester (100% solids basis) | 8.8 |
| Unsat'd Polyester (100% solids basis) | 8.8 |
| DAP | 5.0 |
| Butanol | 20.3 |
| Xylene | 30.4 |
| Titanium Dioxide | 10.9 |
| Phosphoric Acid | 1.0 |
| DCPO | 1.3 |

EXAMPLE 5

A specific clear coat composition was made from the following ingredients in the listed percentage by weight:

| INGREDIENTS | PERCENTAGE BY WEIGHT |
|---|---|
| Vinyl terpolymer | 7.21 |
| Melamine Resin (100% solids basis) | 2.18 |
| Sat'd Polyester (100% solids basis) | 7.98 |
| Epoxy Resin (100% solids basis) | 3.13 |
| Phenolic Resin (100% solids basis) | 3.04 |
| Alkyd Resin (100% solids basis) | 10.62 |
| Xylene | 39.20 |
| Butanol | 26.14 |
| Phosphoric Acid | 0.5 |

EXAMPLE 6

A pigmented white coating composition may be made from the following ingredients in the assigned range of parts by weight:

| INGREDIENTS | RANGE OF PARTS BY WEIGHT |
|---|---|
| Vinyl terpolymer | 1.0 |
| Melamine Resin (100% solids basis) | 0.3–0.65 |
| Alkyd Resin (100% solids basis) | 1.47 |
| Sat'd Polyester (100% solids basis) | 1.1–1.11 |
| Titanium Dioxide | 1.47–1.74 |
| Butanol | 2.86–2.97 |
| Xylene | 4.29–4.45 |
| Phosphoric Acid | 0.08–0.13 |

EXAMPLE 7

A specific white coating composition was made from the following ingredients in the listed percentage by weight:

| INGREDIENTS | PERCENTAGE BY WEIGHT |
|---|---|
| Vinyl terpolymer | 7.53 |
| Melamine Resin (100% solids basis) | 4.99 |
| Sat'd Polyester (100% solids basis) | 8.34 |
| Alkyd Resin (100% solids basis) | 11.07 |
| Butanol | 21.55 |
| Xylene | 32.33 |
| Titanium Dioxide | 13.19 |
| Phosphoric Acid | 1.0 |

EXAMPLE 8

A specific white coating composition was made from the following ingredients in the listed percentage by weight:

| INGREDIENTS | PERCENTAGE BY WEIGHT |
|---|---|
| Vinyl terpolymer | 7.70 |
| Melamine Resin (100% solids basis) | 3.95 |
| Sat'd Polyester (100% solids basis) | 8.47 |
| Alkyd Resin (100% solids basis) | 11.35 |
| Xylene | 34.14 |
| Butanol | 22.76 |
| Titanium Dioxide | 10.93 |
| Phosphoric Acid | 0.7 |

EXAMPLE 9

A specific white coating composition was made from the following ingredients in the listed percentage by weight:

| INGREDIENTS | PERCENTAGE BY WEIGHT |
|---|---|
| Vinyl terpolymer | 5.21 |
| Melamine Resin (100% solids basis) | 2.58 |
| Sat'd Polyester (100% solids basis) | 10.89 |
| Alkyd Resin (100% solids basis) | 12.28 |
| Phenolic Resin(100% solids basis) | 6.53 |

-continued

| INGREDIENTS | PERCENTAGE BY WEIGHT |
|---|---|
| Butanol | 17.77 |
| Xylene | 26.65 |
| Zinc Octoate | 0.02 |
| Manganese Nuxtra | 0.04 |
| Titanium Dioxide | 17.53 |
| Phosphoric Acid | 0.5 |

EXAMPLE 10

A specific white pigmented composition was made from the following ingredients in the assigned percentage by weight:

| INGREDIENTS | % BY WEIGHT |
|---|---|
| Vinyl terpolymer | 7.20 |
| Melamine Resin (100% solids basis) | 2.17 |
| Sat'd Polyester (100% solids basis) | 7.96 |
| Epoxy Resin | 3.13 |
| Phenolic Resin (100% solids basis) | 3.04 |
| Alkyd Resin (100% solids basis) | 10.60 |
| Xylene | 30.58 |
| Butanol | 20.36 |
| Titanium Dioxide | 14.26 |
| Phosphoric Acid | 0.7 |

The aforementioned compositions were applied on a variety of substrates. No chemical treatment other than degreasing was done. The summary of application and cure conditions, and properties of the coatings is tabulated below along with the test method adopted.

The bare CRS panels without iron phosphate coating, coated with composition of example 8, were tested for salt spray exposure per ASTM B 117 and passed more than 400 hours of exposure without any noticeable red rust propagation on scribed portion. The coating thickness on the bare CRS panel for this test was approximately 15 microns. All the compositions showed excellent dry heat resistance (up to 150° C.) and chemical resistance (passed ASTM D 1308). Additionally, all compositions exhibited good recoatability with any of these compositions. Further, same results were obtained when compositions of examples 8 and 9 were applied on iron phosphated CRS and that of example 10 was applied on chrome treated Galvalume.

What is claimed is:

1. A self-priming, heat reactive, rapid curing, chromate free, corrosion resistant coil coating composition comprising:
   (a) a linear vinyl terpolymer having three randomly distributed functional groups comprising acetyl, formal and hydroxyl groups along the vinyl backbone, offering cross-linking sites through the hydroxyl groups during cure;
   (b) an oligomeric alkoxy amino resin;
   (c) combination of two or more resins selected from the group consisting of:
      i) oligomeric saturated polyester resin,
      ii) oligomeric unsaturated polyester resin dissolved in an unsaturated monomer and containing a free radical initiator of high activation energy,
      iii) oligomeric bi-functional phenolic resole resin,
      iv) oligomeric epoxy resin and
      v) low molecular weight polyurethane resin;
   (d) ortho-phosphoric acid catalyst;
   (e) a blend of organic solvents, and optionally

| PRODUCT TYPE | SUBSTRATE | CURE CONDITION PMT, ° C.; TIME, secs | MEK (DOUBLE RUBS) ASTM D 5402-93 | FLEXIBILITY T - BEND | PENCIL HARDNESS ASTM D 3363 |
|---|---|---|---|---|---|
| Example 1 clear coat | Stainless Steel 304, 202 150µ thick | 210, 50 | 100 min. | 0 T; NPO | 4H- |
| Example 2 clear coat | Stainless Steel 304, 202 150µ thick | 232, 50 | 80 min. | 0 T; NPO | 4H |
| Example 3 clear coat | Stainless Steel 304, 202 150µ thick | 232, 50 | 100 min. | 0 T; NPO | 4H |
| Example 4 white coat | Stainless Steel 304, 202 150µ thick | 232, 50 | 80 min. | 0 T; NPO | 6H |
| Example 5 clear coat | Tin plated steel (bare) 150µ thick | 199, 90 | 100 min. | 0 T; NPO | |
| Example 7 white coat | Stainless Steel 304, 202 150µ thick | 260, 30 | 100 min. | 0 T; NPO | 6H |
| Example 8 white coat | CRS (bare) 420µ thick | 260, 80 | 100 min. | 0 T; NPO | 6H |
| | HDGS (bare) 415µ thick | 210, 30 | 100 min. | 2 T; NPO | 6H |
| Example 9 white coat | CRS (bare) 290µ thick | 241, 40 | 100 min. | 0 T; NPO | 6H |
| Example 10 white coat | Galvalume (bare) 600µ thick | 241, 70 | 100 min. | 0 T; NPO | 6H |

(f) chromate free inorganic pigments and/or organic dyes, heat and light stabilizers, wetting and flow control agents.

2. The coating composition as claimed in claim 1, wherein the percentages by weight of polyvinyl alcohol, polyvinyl acetate and polyvinyl formal of the vinyl terpolymer are 6.0–15%, 9–15% and 70–84% respectively.

3. The coating composition as claimed in claim 1, wherein the percentages by weight of polyvinyl alcohol, polyvinyl acetate and polyvinyl formal of the vinyl terpolymer are 6–10%, 9–15% and 78–84% respectively.

4. The coating composition as claimed in claim 1, wherein the percentages by weight of polyvinyl alcohol, polyvinyl acetate and polyvinyl formal of the vinyl terpolymer are 6–7.5%, 10–13% and 80–83% respectively.

5. The coating composition as claimed in claim 1, wherein the weight average molecular weight of said vinyl terpolymer is 15,000 to 80,000.

6. The coating composition as claimed in claim 5, wherein weight average molecular weight of said vinyl terpolymer is 20,000 to 50,000.

7. The coating composition as claimed in claim 1, wherein the oligometric alkoxy amino resin has an average degree of polymerization of no more than 3.

8. The coating composition as claimed in claim 1, wherein methoxy melamine resin is used for cross-linking.

9. The coating composition as claimed in claim 1, wherein the oligomeric saturated polyester has a chain length between 2 and 5.

10. The coating composition as claimed in claim 1, wherein the oligomeric phenolic resole resin has a chain length below 4.

11. The coating composition as claimed in claim 1, wherein the saturated polyester resin is produced from adipic and isophthalic acids, cyclohexane dimethanol and propylene glycols with triphenyl phosphite catalyst in toluene solvent.

12. The coating composition as claimed in claim 1, wherein the phenolic resole resin is produced from formalin, p-tertiary amyl phenol and bis-phenol A with a molar excess of formaldehyde over the substituted phenols.

13. The coating composition as claimed in claim 1, wherein the epoxy resin is made from bisphenol A and epichlorohydrin and has an epoxide equivalent of 150–300.

14. The coating composition as claimed in claim 13, wherein the said epoxy resin has an epoxide equivalent weight of 190–210.

15. The coating composition as claimed in claim 1, wherein the oligomeric unsaturated polyester resin has a number average molecular weight not exceeding 4000 daltons.

16. The coating composition as claimed in claim 1, wherein said unsaturated polyester resin is dissolved in diallyl phthalate (DAP) or diallyl isophthalate (DAIP).

17. The coating composition as claimed in claim 1, wherein the free radical initiator used with the unsaturated polyester is dicumyl peroxide (DCPO).

18. The coating composition as claimed in claim 1, wherein the unsaturated polyester resin is produced from maleic anhydride, dicyclopentadiene and diethylene glycol.

19. The coating composition as claimed in claim 1, wherein the components of the solvent blend are selected from the group consisting of: xylene, toluene, naphtha, isopropanol, butanol, ethanol, methanol, acetone, MEK, MIBK and glycol derivatives.

20. The coating composition as claimed in claim 19, wherein 60 parts of xylene and 40 parts of butanol by weight are used as solvent.

21. The coating composition as claimed in claim 1, wherein the content of total solids in pigmented compositions is minimum of 40% by weight.

22. The coating composition as claimed in claim 1, wherein ortho-phosphoric acid of 88–93% purity is used as the catalyst.

23. The coating composition as claimed in claim 1, which includes 0–50% of the polymer and resin content of one or more chromate free inorganic pigment(s) and/or organic dye(s) and corrosion inhibiting agent(s).

24. The coating composition as claimed in claim 1, wherein corrosion inhibiting agent(s) is/are selected from the group consisting of zinc and other molybdates, zinc phosphate, mica, tolyltriazole, complex organic titanates and other organic inhibitors which act by passive inhibition.

25. The coating composition as claimed in claim 1, as a pigmented composition wherein titanium dioxide is included as the inorganic pigment.

26. The coating composition as claimed in claim 1, wherein the following ingredients are present in the listed range of parts by weight:

| INGREDIENTS | RANGE OF PARTS BY WEIGHT |
| --- | --- |
| Vinyl terpolymer | 1.0 |
| Melamine Resin (100% solids basis) | 0.4–0.5 |
| Polyurethane Resin | 0.8–0.88 |
| Sat'd Polyester (100% solids basis) | 1.3–1.87 |
| Butanol | 2.4–2.7 |
| Xylene | 3.6–4.0 |
| Phosphoric Acid | 0.1–0.15. |

27. The coating composition as claimed in claim 1, wherein the following ingredients are present in the listed range of parts by weight:

| INGREDIENTS | RANGE OF PARTS BY WEIGHT |
| --- | --- |
| Vinyl terpolymer | 1.0 |
| Melamine Resin (100% solids basis) | 0.2–0.3 |
| Phenolic Resin (100% solids basis) | 0.9–1.0 |
| Sat'd Polyester (100% solids basis) | 0.9–1.0 |
| Butanol | 2.3–2.5 |
| Xylene | 3.4–3.7 |
| Phosphoric Acid | 0.1–0.15. |

28. The coating composition as claimed in claim 1, wherein the following ingredients are present in the listed range of parts by weight:

| INGREDIENTS | RANGE OF PARTS BY WEIGHT |
| --- | --- |
| Vinyl terpolymer | 1.0 |
| Melamine Resin (100% solids basis) | 0.25–0.3 |

-continued

| INGREDIENTS | RANGE OF PARTS BY WEIGHT |
|---|---|
| Phenolic Resin (100% solids basis) | 0.8–1.0 |
| Epoxy Resin (100% solids basis) | 1.0–1.1 |
| Butanol | 2.3–2.7 |
| Xylene | 3.5–4.0 |
| Phosphoric Acid | 0.1–0.15. |

29. The coating composition as claimed in claim 1, wherein the following ingredients are present in the listed percentage by weight:

| INGREDIENTS | PERCENTAGE BY WEIGHT |
|---|---|
| Vinyl terpolymer | 10.1 |
| Melamine Resin (100% solids basis) | 3.4 |
| Sat'd Polyester (100% solids basis) | 8.8 |
| Unsat'd Polyester (100% solids basis) | 8.8 |
| DAP | 5.0 |
| Butanol | 20.3 |
| Xylene | 30.4 |
| Titanium Dioxide | 10.9 |
| Phosphoric Acid | 1.0 |
| DCPO | 1.3. |

30. A method of forming a coating on a ferrous or non-ferrous metallic substrate, which comprise the steps of:
   a) degreasing the surface of said substrate on which coating is to be applied;
   b) preparing the coating composition as defined in claim 1, by dissolving the vinyl terpolymer in a blend of organic solvents, adding the amino resin and other resins to this solution, and, optionally, chromate free inorganic pigments and/or organic dyes;
   c) milling the contents to a homogeneous consistency;
   d) adding the balance solvents and the acid catalyst;
   e) applying said coating composition by spray coating or roller coating method to degreased but untreated substrate to attain the desired thickness and
   f) curing coating so applied to desired hardness at a peak metal temperature of 199–260° C. for 30–90 seconds.

31. The method as claimed in claim 30, wherein clear coatings are prepared from a composition having the following ingredients

| INGREDIENTS | RANGE OF PARTS BY WEIGHT |
|---|---|
| Vinyl terpolymer | 1.0 |
| Melamine Resin (100% solids basis) | 0.4–0.5 |
| Polyurethane Resin | 0.8–0.88 |
| Sat'd Polyester (100% solids basis) | 1.3–1.87 |
| Butanol | 2.4–2.7 |
| Xylene | 3.6–4.0 |
| Phosphoric Acid | 0.1–0.15, | to obtain coatings of 32–50% weight solids.

32. The method as claimed in claim 30, wherein a white pigmented coating is prepared from a composition having the following ingredients

| INGREDIENTS | RANGE OF PARTS BY WEIGHT |
|---|---|
| Vinyl terpolymer | 1.0 |
| Melamine Resin (100% solids basis) | 0.2–0.3 |
| Phenolic Resin (100% solids basis) | 0.9–1.0 |
| Sat'd Polyester (100% solids basis) | 0.9–1.0 |
| Butanol | 2.3–2.5 |
| Xylene | 3.4–3.7 |
| Phosphoric Acid | 0.1–0.15 | to obtain coatings of 40–60% weight solids.

33. The method as claimed in claim 30, wherein thickness of the coating as applied is 5–30 microns.

34. The method as claimed in claim 33, where the thickness of the applied coating is 5–15 microns.

35. The method as claimed in claim 30, wherein said coating is applied directly on the surface of the degreased and untreated metal substrate as a topcoat.

36. The method as claimed in claim 30, wherein the said coating is applied directly on the surface of the degreased and untreated substrate as an undercoat which is followed by application of topcoat(s) of itself or any other based on one or more of resins selected from the group consisting of epoxy, urethane, alkyd, amino and polyester.

37. An article comprising:
   a) a ferrous or non-ferrous metallic substrate,
   b) a coating applied to at least one surface of the degreased and untreated substrate by a method as claimed in claim 30.

38. The article as claimed in claim 37, wherein the said substrate is selected from the group comprising galvanized steel, stainless steel, cold rolled steel, tinplated steel, galvalume, aluminum and other non-ferrous substrates.

39. The coating composition as claimed in claim 1, wherein one or more resins (c)(i) to (c)(v) is used in combination with a short or medium oil alkyd resin as another co-resin components for the composition and optionally a drier for composition containing the said alkyd resin.

40. The coating composition as claimed in claim 39, wherein the alkyd resin has hydroxyl number between 120 and 140.

41. The coating composition as claimed in claim 40, wherein the alkyd resin is made from one or more drying oil, one or more polyhydric alcohol, one or more dicarboxylic acid, and an organic solvent.

42. The coating composition as claimed in claim 41, wherein the alkyd resin is made from linseed oil, glycerine, isophthalic acid in xylene as solvent.

43. The coating composition as claimed in claim 39, wherein zinc octoate and manganese nuxtra are used as driers.

44. The coating composition as claimed in claim 39, wherein the listed ingredients are used in following percentage by weight:

| INGREDIENTS | PERCENTAGE BY WEIGHT |
| --- | --- |
| Vinyl terpolymer | 7.21 |
| Melamine Resin (100% solids basis) | 2.18 |
| Sat'd Polyester (100% solids basis) | 7.98 |
| Epoxy Resin (100% solids basis) | 3.13 |
| Phenolic Resin (100% solids basis) | 3.04 |
| Alkyd Resin (100% solids basis) | 10.62 |
| Xylene | 39.20 |
| Butanol | 26.14 |
| Phosphoric Acid | 0.5. |

45. The coating composition as claimed in claim 39, wherein the listed ingredients are used in following range of parts by weight:

| INGREDIENTS | RANGE OF PARTS BY WEIGHT |
| --- | --- |
| Vinyl terpolymer | 1.0 |
| Melamine Resin (100% solids basis) | 0.3–0.65 |
| Alkyd Resin (100% solids basis) | 1.47 |
| Sat'd Polyester (100% solids basis) | 1.1–1.11 |
| Titanium Dioxide | 1.47–1.74 |
| Butanol | 2.86–2.97 |
| Xylene | 4.29–4.45 |
| Phosphoric Acid | 0.08–0.13. |

46. The coating composition as claimed in claim 39, wherein the listed ingredients are used in following percentage by weight:

| INGREDIENTS | PERCENTAGE BY WEIGHT |
| --- | --- |
| Vinyl terpolymer | 7.53 |
| Melamine Resin (100% solids basis) | 4.99 |
| Sat'd Polyester (100% solids basis) | 8.34 |
| Alkyd Resin (100% solids basis) | 11.07 |
| Butanol | 21.55 |
| Xylene | 32.33 |
| Titanium Dioxide | 13.19 |
| Phosphoric Acid | 1.0. |

47. The coating composition as claimed in claim 39, wherein the listed ingredients are used in following percentage by weight:

| INGREDIENTS | PERCENTAGE BY WEIGHT |
| --- | --- |
| Vinyl terpolymer | 7.70 |
| Melamine Resin (100% solids basis) | 3.95 |
| Sat'd Polyester (100% solids basis) | 8.47 |
| Alkyd Resin (100% solids basis) | 11.35 |
| Xylene | 34.14 |
| Butanol | 22.76 |
| Titanium Dioxide | 10.93 |
| Phosphoric Acid | 0.7. |

48. The coating composition as claimed in claim 39, wherein the listed ingredients are used in following percentage by weight:

| INGREDIENTS | PERCENTAGE BY WEIGHT |
| --- | --- |
| Vinyl terpolymer | 5.21 |
| Melamine Resin (100% solids basis) | 2.58 |
| Sat'd Polyester (100% solids basis) | 10.89 |
| Alkyd Resin (100% solids basis) | 12.28 |
| Phenolic Resin (100% solids basis) | 6.53 |
| Butanol | 17.77 |
| Xylene | 26.65 |
| Zinc Octoate | 0.02 |
| Manganese Nuxtra | 0.04 |
| Titanium Dioxide | 17.53 |
| Phosphoric Acid | 0.5. |

49. The coating composition as claimed in claim 39, wherein the listed ingredients are used in following percentage by weight:

| INGREDIENTS | PERCENTAGE BY WEIGHT |
| --- | --- |
| Vinyl terpolymer | 7.20 |
| Melamine Resin (100% solids basis) | 2.17 |
| Sat'd Polyester (100% solids basis) | 7.96 |
| Epoxy Resin | 3.13 |
| Phenolic Resin (100% solids basis) | 3.04 |
| Alkyd Resin (100% solids basis) | 10.60 |
| Xylene | 30.58 |
| Butanol | 20.36 |
| Titanium Dioxide | 14.26 |
| Phosphoric Acid | 0.7. |

* * * * *